United States Patent [19]

Maeda et al.

[11] Patent Number: 5,434,829
[45] Date of Patent: Jul. 18, 1995

[54] INFORMATION REPRODUCING APPARATUS FOR PROPERLY SYNCHRONIZING THE REPRODUCING OF RECORDED INFORMATION

[75] Inventors: Shigemi Maeda, Yamatokoriyama; Tomiyuki Numata, Tenri; Kunio Kojima, Nabari, all of Japan

[73] Assignee: Sharp Kabushiki Kaisha, Osaka, Japan

[21] Appl. No.: 78,003

[22] Filed: Jun. 15, 1993

[30] Foreign Application Priority Data

Oct. 12, 1992 [JP] Japan .................. 4-273053

[51] Int. Cl.6 ............................................. G11B 7/00
[52] U.S. Cl. ......................... 369/48; 369/54; 369/124
[58] Field of Search ............................ 369/47–48, 369/54, 58, 59, 111, 124; 360/27, 32, 33.1, 36.1, 36.2; 358/335, 337, 339, 342

[56] References Cited

U.S. PATENT DOCUMENTS

| | | | |
|---|---|---|---|
| 4,907,216 | 3/1990 | Rijnsburger . | |
| 5,170,385 | 12/1992 | Senshu et al. | 369/48 |
| 5,278,815 | 1/1994 | Mashimo et al. | 369/48 |
| 5,315,571 | 5/1994 | Maeda et al. | 369/50 |

FOREIGN PATENT DOCUMENTS 63-138506 6/1988 Japan .
1-165072 6/1989 Japan .

*Primary Examiner*—W. R. Young
*Attorney, Agent, or Firm*—David G. Conlin; Robert F. O'Connell

[57] ABSTRACT

An information reproducing apparatus has (1) a reference signal generating circuit for generating a first reference signal corresponding to reproduced signal of the main information; (2) a first switching circuit for selecting one of the reproduced signal and the first reference signal; and (3) a controller, which generates a selection instructing signal, for controlling such that the reproduced signal is selected during reproducing of the main information recorded area while the first reference signal is selected during reproducing of the main information unrecorded area. With the arrangement, when the main information unrecorded area is reproduced, the clock for carrying out the reproducing of main information is synchronized with the first reference signal which corresponds to the reproduced signal. So, when the reproducing area is changed from the main information unrecorded area to the main information recorded area, the synchronizing with the reproduced signal is carried out in a short time, thereby improving the reliability of the reproducing process.

14 Claims, 11 Drawing Sheets

FIG.10 PRIOR ART
FIG.11 PRIOR ART
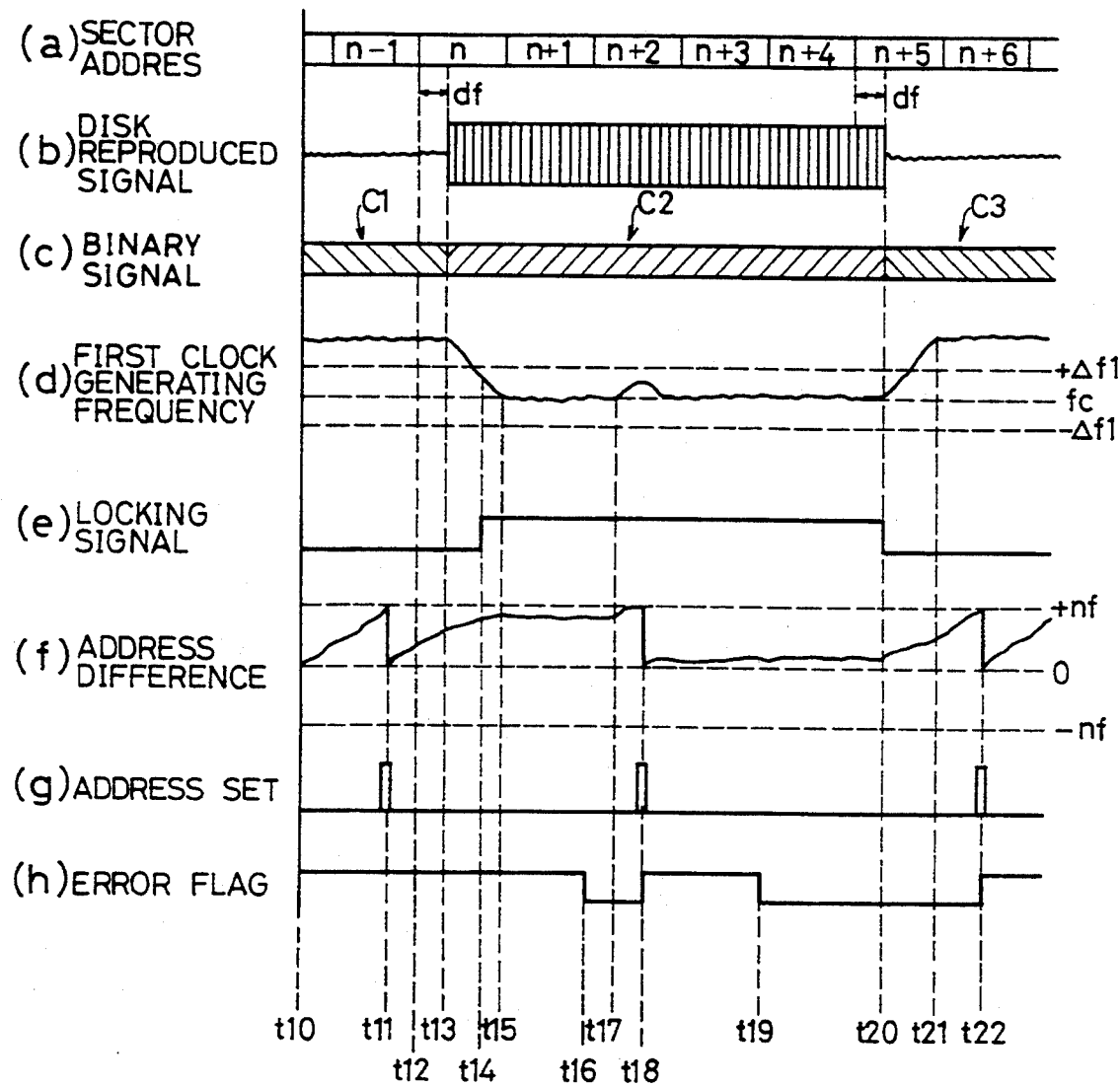
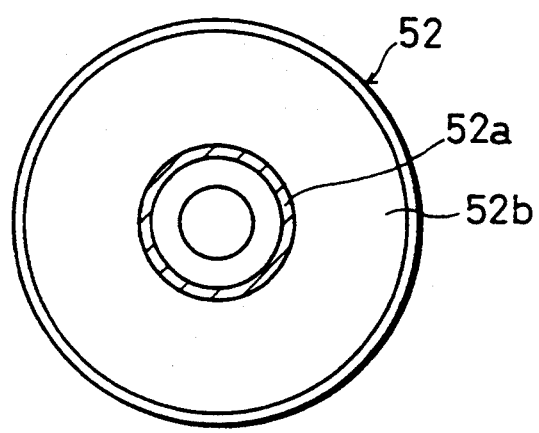

INFORMATION REPRODUCING APPARATUS FOR PROPERLY SYNCHRONIZING THE REPRODUCING OF RECORDED INFORMATION

FIELD OF THE INVENTION

The present invention relates to an information reproducing apparatus which reproduces recorded information from a recording medium such as a compact disk in which the recorded information such as digital audio signals and computer-use data are recorded.

BACKGROUND OF THE INVENTION

A compact disk (hereinbelow referred to as CD) has been widely used as a recording medium in which continuous information such as music information is digitally recorded in the form of minute pits which can be optically detected. A CD-ROM (Compact Disk Read Only Memory) starts to be widely applied to record not only the music information but also digital information such as computer-use data since the CD has the big recording capacity and the good productivity. Hereinbelow the CD-ROM is also referred to as the CD for sake of convenience. The CDs are reproduced by an optical disk reproducing apparatus (CD player) which is used for reproduction only.

FIGS. 12 and 13 show the schematic signal format for use in the CD. As shown in FIG. 12, one frame 50a of a recording signal is composed of: (1) a frame synchronization signal 50b indicative of a head end of the frame; (2) a sub-code 50c indicative of an additional information for data; and (3) a data field 50d which is formed by adding 8-byte parity code to 24-byte data of main information. The 8-byte parity code is for correcting error upon detecting the error in the process. The data field 50d is formed based on an error detection and correction system into which non-completion type interleave which is referred to as CIRC (Cross Interleaved Reed Solomon Code) is incorporated.

As shown in FIG. 13, one sub-coding frame (hereinbelow referred to as sector) 51a is composed of 98 frames 50a. A sub-coding block 51c is composed of 98 sub-codes 50c of the respective frames 50a. The data of the sub-coding block 51c indicate the track number, which is referred to as a song number when the main information is the music information, and the absolute address on the disk.

The length of one sector is 13.3 ms which corresponds to 1/75 seconds. A sector number is expressed by the combination of "minutes": "second": "a number of 0 to 74 within one second", the sector number being indicative of the assigned number on the disk. The sector number indicates both time information and position information which respectively increase consecutively as the radial position on the disk becomes far away from the innermost portion.

FIG. 11 is a plan view showing the area arrangement on the CD. A disk 52 has a main information recorded area 52b and a TOC (Table Of Contents) area 52a. Main information such as music information and the sector numbers derived from the sub-code are recorded in the main information recorded area 52b. Additional information is recorded in the TOC area 52a, the additional information being derived from the sub-code with regard to each main information recorded in the main information recorded area 52b. The additional information includes each track number, the recording start sector number for each track, information for identifying whether the main information recorded in the track is audio information or computer-use data.

When the CD player is loaded with the CD having the above-mentioned format, the sub-code information is first read out of the TOC area 52a. According to the reading, the respective numbers of the main information (corresponding to the song numbers for the music information), the recording start sector number for each main information, the kinds (audio or data) of the recorded information are identified. When received the reproduction instruction, the information of the TOC area 52a is compared with the sector number derived from the sub-code of the main information recorded area 52b. According to this comparison, the reproducing operation with respect to a target track is immediately carried out with the access operation combined.

The information is recorded in the CD based on the CLV (Constant Linear Velocity) method. Therefore, the recording density is constant over the whole disk, thereby being preferable for improving the recording capacity of the CD. The CD player rotates the CD at the constant linear velocity such that the interval between the frame synchronization signals has a reference length for example. The frame synchronization signals are derived from the reproduced signal which is reproduced from the recorded information in the CD based on the CLV method employing the above-mentioned signal format.

In contrast, when a variety of information such as music information and computer-use data are recorded and reproduced with respect to a rewritable disk such as a magneto-optical disk which has been recently developed, it is hoped to provide a compatible disk recording and reproduction apparatus which has a common reproduction system to both the CD and the magneto-optical disk.

such case, especially in an initial disk wherein no information is recorded, (1) the access operation with respect to an arbitrary sector and (2) some means for carrying out the CLV control with respect to the main information unrecorded area are required prior to the recording. This is because there exists no absolute address, in the initial disk information, using the above-mentioned sub-code and no frame synchronization signal used for the CLV control.

As shown in FIG. 14, in order to record an absolute address information which is equivalent to the absolute, address information derived from the sub-code, there is proposed the following method wherein a series of information such as the absolute address information and error detection and correction code is subjected to "biphase-mark" modulation and thereafter a guide groove 52c (indicated as hatched lines for sake of convenience), which is formed beforehand (pre-recorded) as a pre-recorded information in a radial direction of the disk at a predetermined interval, is deviated to an outer side or to inner side of a radial direction in response to the respective modulated bits "1" or "0" (see U.S. Pat. No. 4,907,216). The information reproducing apparatus can carry out the CLV control and the absolute address information detection with respect to the the main information recorded area 52b of the rewritable recording medium such as the magneto-optical disk when the above-mentioned recording method is adopted.

FIG. 9 is a block diagram showing an example of the information reproducing apparatus using the magneto-optical disk which is compatible with the above-mentioned CD format. A magneto-optical disk 61 is supported by a spindle motor 62 so as to rotate. A signal reproduced by an optical head 64 is amplified by a reproducing amplifier 65. A magneto-optical signal (Ps), which is changed into a binary condition, is outputted to both a first clock generating circuit 68 and a reproduced data processing circuit 74.

The pre-recorded information is outputted to a pre-recorded information detecting circuit 66. The pre-recorded information detecting circuit 66 is composed of a band-pass filter and a PLL for example, wherein a synchronized clock is generated by the PLL with respect to the pro-recorded information of the reproduced signal which is extracted by the band-pass filter. The clock synchronized with the pre-recorded information which is formed by the biphase-mark modulation of the absolute address is outputted to a CLV controlling circuit 63.

The CLV controlling circuit 63 compares the frequency of the synchronized clock of the pre-recorded information detecting circuit 66 with a reference frequency, within the circuit 63, which is synchronized with a clock of a second clock generating circuit 70 (later described). The CLV controlling circuit 63 controls the spindle motor 62 in response to the frequency difference, thereby causing to carry out the CLV control with accuracy with respect to the unrecorded area where no main information is recorded.

The pre-recorded information of the reproduced signal which is extracted by the pre-recorded information detecting circuit 66 is supplied to an address detecting circuit 67 which is composed of a biphase-mark demodulation, circuit and an address decoder circuit. The address detecting circuit 67 carries out the biphase-mark demodulation with respect to the pre-recorded information which is extracted by the pre recorded information detecting circuit The demodulated pre-recorded information is decoded into position information on the disk, i.e., the absolute address (equal to the sector) by the address decoder circuit so as to be supplied to a controller 75.

A reproduced data processing circuit 74 carries out the removing of the frame synchronization signal from the bynary magneto-optical signal (Ps) of the reproduced signal from the reproducing amplifier 65 and the EFM (Eight to Fourteen Modulation) demodulation so as to remove the sub-code information. Thus removed signals are supplied to the controller 75. The reproduced data processing circuit 74 also writes the main information and the parity as the reproduced data in a memory 73 so as to carry out the error correcting operation based on the CIRC.

The controller 75 receives a reproducing instruction from a host device through a terminal 79 and an interface 78. The controller 75 has an access function. According to the access function, the controller 75 identifies where the optical head 64 is located on the disk upon reception of the absolute address information from the address detecting circuit 67 and the optical head is moved to a target position by use of an optical head moving mechanism (not shown). The controller 75 also identifies the sub-code information of the reproduced data processing circuit 74.

When considering the clock system which processes the reproduced data, a clock synchronized with the reproducing signal should be used for writing the reproduced signal which has been subjected to the EFM demodulation. The EFM demodulated data are written in the memory 73 in the following manner: (1) the memory address is supplied to the memory 73 through a switching device 72, the memory address being generated by a write address generating circuit 69 resposive to the clock of a first clock generating circuit 68; and (2) the EFM demodulated data are written in accordance with the supplied memory address in a predetermined sequence.

In contrast, as to the reading operation from the memory 73, the data are read out from the memory 73 in the following manner: (1) the memory address is supplied to the memory 73 through the switching device 72, the memory address being generated by a read address generating circuit 71 resposive to a reference clock of a second clock generating circuit 70; and (2) the data are written in accordance with the supplied memory address in a predetermined sequence.

In such case, the data corresponding to the main data of FIG. 13 is converted into the analog audio information so as to output through a terminal 77 or so as to output to the host device which is connected with the terminal 79 through the interface 78. The address generating sequence of the write address generating circuit 69 is not the same as that of the read address generating circuit 71. The respective address generating circuits 69 and 71 also carry the deinterleave by which the data, arranged based on the interleave during the recording of the disk, are relocated as the original data.

The continuous reproducing is carried out by controlling the spindle motor 62 in a minute manner such that the period of the frame synchronization signal of the reproduced signal coincides with the reference period of the second clock generating circuit 70 system, thereby avoiding the surplus and shortage of the recording capacity of the limitative memory 73 for the data writing and the data reading to and from the memory 73. When the surplus and shortage of the memory 73 occurs in the recording capacity, setting operation is carried out, in order to avoid the destruction of the data which are already written, such that the read address is set as the write address when it is detected that the difference between the write address and the read address exceeds by the amount corresponding to ($\pm$nf) frames (referred to as jitter margin or so).

The information reproducing apparatus is arranged that the reference clock, which is different from the lock synchronized with the reproduced data, is used as the address generating-use clock of the read address generating circuit 71, thereby resulting in that the fluctuation of the disk rotation system, which is contained in the reproduced signal, is absorbed. Accordingly, the high fidelity audio reproduction can be achieved without time base fluctuation. This is generally called as TBC (Time Base Correcting), which is a superior feature of the digital audio device.

However, in the information reproducing apparatus which uses the above-mentioned recordable disk, when the computer data, text data, compressed digital audio information, or image information are reproduced, unlike the reproducing of the continuous information, the number of the sector to be reproduced becomes discrete and the unrecorded area of the main information are distributed over the whole disk, thereby proposing the following problems.

FIG. 10 is a time chart showing the problem when the CD format is adapted to the recordable disk, and showing the operation wherein the disk normally rotates at a predetermined linear velocity and at the time of (t17) the temporary fluctuation in the disk rotation is occurred due to the disturbance such as a mechanical shock. Note that the following explains, without the address generation for the error correction, like FIG. 9 for the convenience' sake of the explanation.

FIG. 10 shows the reproducing operation where the recording information such as the computer-use coding data are stored over five sectors between sector address (n) through (n+4) with respect to a sector address (a) on the disk having the unique absolute address indicated by the pre-recorded information. A disk reproduced signal (b) delays by (df) with respect to corresponding respective sector head ends. The delay amount (df) is determined based on the delay due to the coding and decoding of the CIRC.

Sector addresses (n−1), (n+5), and (n+6), which correspond to the sectors other than the above-mentioned five sectors, are information unrecorded areas. The disk reproduced signal (b) is changed into a binary signal (c) by use of a comparator or other device. In the information unrecorded areas of sector addresses (n−1), (n+5), and (n+6), the disk reproduced signal (b) becomes a noise level. The corresponding areas C1 and C3 have meaningless data which contain the high frequency component. Accordingly, the PLL for generating the first clock which is synchronized with the disk reproduced signal (b) tries to follow the binary signal (c) and carries out the operation like (d).

More specifically, the axis of ordinate of FIG. 3(d) means the frequency wherein the locking range of $\pm \Delta f1$ is indicated. The reproducing clock is a high frequency in the area C1 of the information unrecorded area and the PLL pull-in operation is carried out at the time (t13) in the information recorded area C2 where the reproduction is carried out. At the time (t17), the rotating system receives a disturbance such as the mechanical shock to the information reproducing apparatus and follows the disturbance. When the area C3 is again reproduced at the time (t20), the slipping off the PLL is occurred thereby causing to generate a clock having a high frequency. Accordingly, a locking signal (e) indicative of the PLL pull-in states shows a locking state during the time period between (t12) and (t20).

When corresponding to the above-mentioned TBC operation, the first clock synchronized with the reproduced signal is used as the memory writing-use clock while the constant second clock is used as the memory reading-use clock. This results in that an address difference (f) between the write address and the read address gradually increases from the time (t10) and the address difference (f) exceeds the jitter margin of ($\pm nf$) for the memory 73 at the time (t11), at this time the write address setting operation is carried out in accordance with the address set (g). Afterwards, the normal reproducing operation is carried out when the address difference falls within the jitter margin of ($\pm nf$). However, at the time (t18), the address difference exceeds again the jitter margin of ($\pm nf$) due to the affection of the small disturbance occurred at the time (t17), thereby carrying out the write address setting operation.

Accordingly, an error flag (h) indicative of the error corrected results corresponding to the above-mentioned reproducing example is correct at the time (t16) while the error flag (h) is in the error state at the time (t18) when the write address setting operation is carried out. Therefore, the reproducing operation having the original jitter margin can not be carried out upon reception of a small disturbance, thereby causing the decreasing of the reliablity of the reproducing operation. Note that the error flag (h) indicates the corrected results by the CIRC and is released followed by the interleave delay corresponding to one sector or more.

Further, as is clear from the above-mentioned example, the first clock generating frequency is extraordinarily higher than the normal freqency fc for the area C1 of the information unrecorded area. This presents the problem that the reliability for reading the head end of the start position to be reproduced is lowered since it takes long time to carry out the PLL pull-in operation from the time (t13) when the sector data to be reproduced are entered.

SUMMARY OF THE INVENTION

It is an object of the present invention to provide an information reproducing apparatus which can carry out the PLL pull-in operation in a short time without affection due to the disturbance when the reproducing area is changed from main information unrecorded area to main information recorded area.

In order to achieve the foregoing object, the present invention is directed to an information reproducing apparatus for reproducing main information from a desired area of a recording medium based on the identification between main information recorded area and main information unrecorded in accordance with address information which is pre-recorded on the recording medium.

The information reproducing apparatus has (1) reference signal generating means for generating a first reference signal corresponding to reproduced signal of the main information; (2) selecting means for selecting one of the reproduced signal and the first reference signal which are entered to the selecting means; (3) controlling means, which generates a selection instructing signal in response to the address information, for controlling the selecting means such that the reproduced signal is selected during reproducing of the main information recorded area while the first reference signal is selected during reproducing of the main information unrecorded area in accordance with the selection instructing signal; and (4) reproduced signal processing means, which is connected with the selecting means and generates a clock synchronized with the output of the selecting means, for carrying out reproducing process of the main information in response to the generated clock.

With the arrangement, the identifying between the main information recorded area and the main information unrecorded area is carried out in accordance with the address information which is pre-recorded on the recording medium. The reproduced signal processing means carries out the synchronizing with respect to the reproduced signal in a short time when the reproducing area is changed from the main information unrecorded area to the main information recorded area, since the clock for carrying out the reproducing of main information is synchronized with the first reference signal, which corresponds to the reproduced signal, during the reproducing of the main information unrecorded area.

The controlling means may have (a) timing generating means for generating a timing signal for each synchronizing signal of the address information and (b) synchronization means, which identifies between a start position and an end position of the main information recorded area according to the timing signal, for synchronizing the selection instructing signal with the timing signal. With the arrangement, the changing timing from the main information unrecorded area to the main information recorded area can be identified with accuracy since the start and end positions of the main information recorded area are identified according to the timing signal for each synchronizing signal of the address information and the selection instructing signal is synchronized with the timing signal, thereby much improving the reliability of the reproducing process.

Alternatively, the identifying between the main information recorded area and the main information unrecorded area may be done in response to a detecting signal which is derived from the signal condition of the reproduced signal from the recording medium. In such case, the synchronizing with respect to the reproduced signal is also carried out in a short time when the reproducing area is changed from the main information unrecorded area to the main information recorded area.

The reference signal generating means may have oscillating means for outputting a clock having a frequency of a predetermined multiples of an audio sampling frequency. In the case, the first reference signal is synthesized so as to alternate between a signal having a 23 dividing frequency of the clock and a signal having a 24 dividing frequency of the clock. With the arrangement, it is not necessary to separately provide oscillating means for generating the first reference signal in an information reproducing apparatus for reproducing only.

Moreover, instead of the reference signal generating means, recording signal processing means may be adopted, the recording signal processing means processing externally entered recording information so as to be converted into a recording signal having a signal format suitable for the recording medium character, the converted signal being outputted as the recording signal. In such case, the recording signal corresponds to the first reference signal. With the arrangement, it is not necessary to separately provide an exclusive means for generating the first reference signal, thereby decreasing the burdens of the circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention:

FIG. 10 is an explanatory diagram showing signals during the information reproducing of the information reproducing apparatus of FIG. 9;

FIG. 11 is a schematic plan view showing a compact disk;

DESCRIPTION OF THE EMBODIMENTS

The following description deals with the first preferred embodiment of the present invention with reference to FIGS. 1 through 5.

Figure 1:
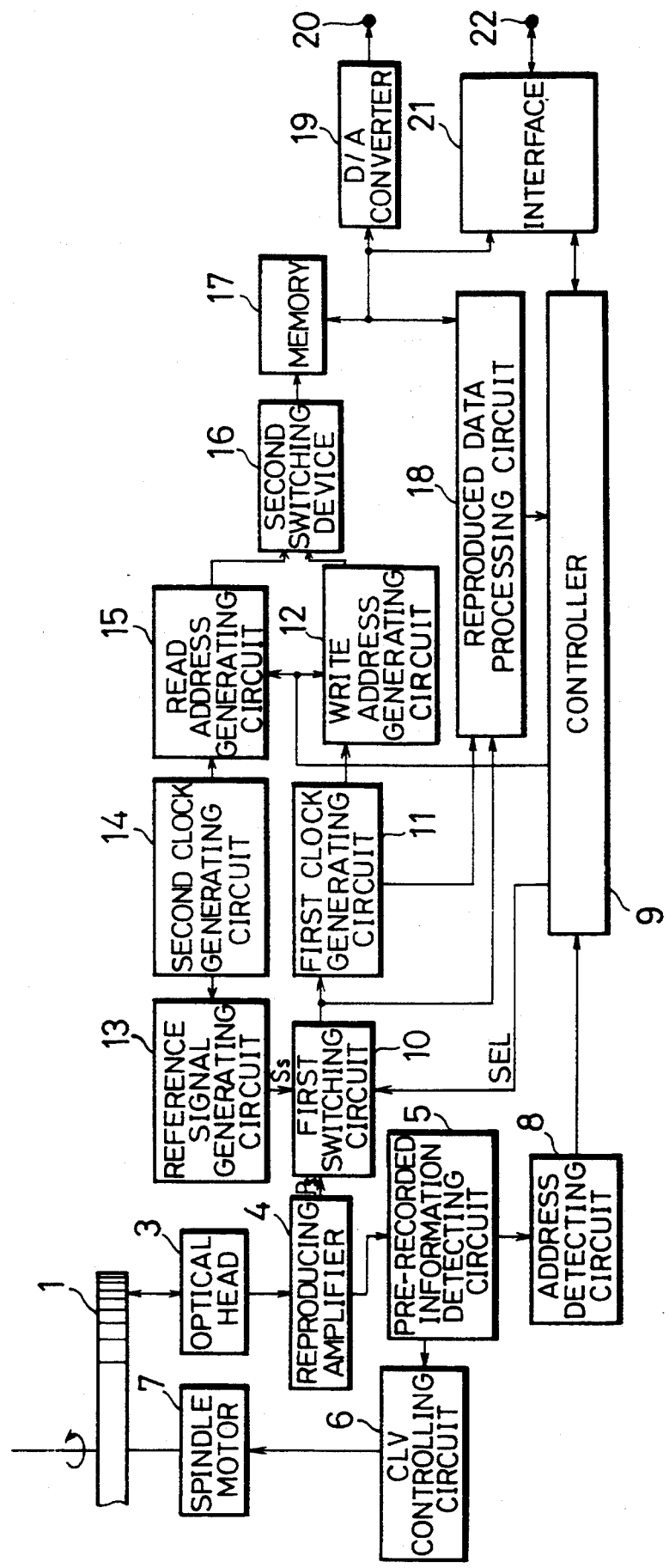
FIG. 1 is a block diagram showing an information reproducing apparatus of the first embodiment in accordance with the present invention.

As shown in FIG. 1, the information reproducing apparatus of the present embodiment has a spindle motor 7 for supporting a magneto-optical disk 1 and for rotating it and an optical head 3 for projecting the laser light onto the magneto-optical disk 1 and for outputting a reproduced signal which varies depending on the reflected light from the magneto-optical disk 1. The reproduced signal of the optical head 3 is sent to a reproducing amplifier 4. The reproducing amplifier 4 amplifies the reproduced signal and outputs as a binary magneto-optical signal Ps to both a first switching circuit 10 and a pre-recorded information detecting circuit 5.

The pre-recorded information detecting circuit 5 is composed of a band-pass filter and a PLL (Phase Locked Loop) for example. A clock synchronized with the pre-recorded information of the reproduced signal extracted by the band-pass filter is generated by the PLL. A CLV controlling circuit 6 is connected with the pre-recorded information detecting circuit 5. A clock is synchronized with the pre-recorded information which is formed based on the biphase-mark modulation of the absolute address is supplied to the CLV controlling circuit 6.

The CLV controlling circuit 6 compares the frequency the synchronizing clock of the pre-recorded information detecting circuit 5 with a reference frequency which is synchronized with a clock of a second clock generating circuit 14 (later described). The CLV controlling circuit 6 controls the spindle motor 7 in response to the frequency difference of the comparison, thereby causing to carry out the CLV control with accuracy.

The pre-recorded information of the reproduced signal which is extracted by the pre-recorded information detecting circuit 5 is supplied to an address detecting circuit 8 which is composed of a biphase-mark demodulation circuit and an address decoder. The address detecting circuit 8 carries out the biphase-mark demodulation with respect to the pre-recorded information. The demodulated pre-recorded information is decoded by the address decoder so as to detect a sector synchronizing signal, so as to decode the absolute address information, and so as to detect the error. The resultant signals are supplied to a controller 9 (controlling means).

The first switching circuit 10 is a selecting means for switching an entered signals in response to a selection instructing signal SEL. The first switching circuit 10 receives the binary magneto-optical signal Ps from the reproducing amplifier 4 and a first reference signal Ss from a reference signal generating circuit 13 (reference signal generating means) which is later discribed. The first switching circuit 10 selects one of the signals Ps and Ss and outputs the selected one to a first clock generating circuit 11 (reproduced signal processing means) and a reproduced data processing circuit 18 (reproduced signal processing means).

The first clock generating circuit 11 generates a write address generating-use clock fw, which is synchronized by the reproduced signal PLL, with respect to the binary magneto-optical signal Ps in the reproduced signal or the first reference signal Ss, the clock fw being supplied to a write address generating circuit 12 (reproduced signal processing means) and the reproduced signal PLL clock for the EFM demodulation being supplied to the reproduced data processing circuit 18.

The second clock generating circuit 14 generates a read address generating-use reference clock fr so as to output to a read address generating circuit 15 (reproduced signal processing means). The second clock generating circuit 14 generates a reference signal generating-use clock so as to output to the reference signal generating circuit 13. The reference signal generating circuit 13 generates the first reference signal Ss corresponding to the main information on the magneto-optical disk 1 in response to the reference clock of the second clock generating circuit 14.

The first reference signal Ss shall be ideally a signal without time base fluctuation to which the EFM processing has already been subjected. However, a reference signal having a single frequency which coincides with a channel bit rate of the EFM signal may be the first reference signal Ss, since it is the object to fix the reproduced signal PLL frequency in the first clock generating circuit 11 to the center frequency, i.e., the normal frequency fc.

Especially, the information reproducing apparatus for reproducing only usually adops a quartz (oscillating means) having a frequency of 16.9344 MHz, as a master clock of the system, which is 384 times of the audio sampling frequency (44.1 kHz). However, there is no such relation as of multiples between the frequency of 16.9344 MHz and the channel bit rate frequency (4.3218 MHz), since the ratio therebetween is 1:3.918 ... So, the reference signal like FIG. 5 may be assigned.

Figure 5:
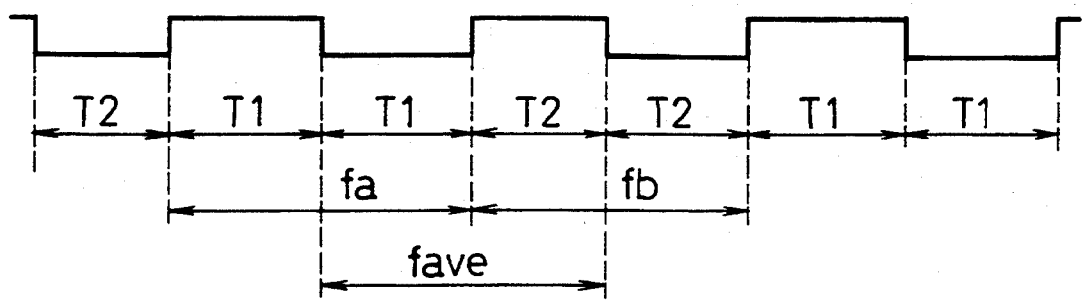
FIG. 5 is an explanatory diagram showing a first reference signal.

More specifically, the reference signal of FIG. 5 is synthesized so as to alternate between (1) a signal (fa) having a 24 dividing frequency of the master clock (i.e., a signal having a length T1 which corresponds to 24 counts of the master clock) and (2) a signal (fb) having a 23 dividing frequency of the master clock (i.e., a signal having a length T2 which corresponds to 23 counts of the master clock).

During the period of (fa) the frequency of the signal (fa) is:

$$(16.9344 \text{ MHz}/(24+24)) = 352.8 \text{ kHz}$$

During the period of (fb) the frequency of the signal (fb) is:

$$(16.9344 \text{ MHz}/(23+23)) \approx 368.14 \text{ kHz}$$

The average frequency (fave) is:

$$(16.9344 \text{ MHz}/(23+24)) \approx 360.31 \text{ kHz}$$

The average frequency (fave) has an error of mere 0.1 percent of a 6 channel bit repetitive signal in the EFM signal, i.e., (4.3218 MHz/(6+6))=360.15 kHz. So, the signal having the average frequency (fave) may be adopted as the reference signal which complies with the above-mentioned object without using a separate quartz oscillator.

In contrast, in response to the reproduced PLL clock generated by the first clock generating circuit 11, the reproduced data processing circuit 18 (1) separates the frame synchronizing signal from the binary magneto-optical signal Ps selected by the first switching circuit 10, (2) carries out the EFM demodulation so as to extract sub-code information, (3) generates a lock detecting signal of the reproduced signal PLL based on the monitoring the detecting states of the frame synchronizing signal, the lock detecting signal being sent to the controller 9, and (4) writes the main information and the parity as reproduced data to a memory 17, and carries out the reproducing processing, i.e., the error correcting operation based on the CIRC in response to the reproduced data.

The writing of the reproduced data to the memory 17 is carried out as follows like the earlier mentioned conventional manner. More specifically, memory address, which is generated by the write address generating circuit 12, is supplied to the memory 17 through a second switching circuit 16 (reproduced signal processing means) and thereafter the writing is carried out in a predetermined sequence combined with the operation of the reproduced data processing circuit 18. The error correcting operation of the reproduced data which is written to the memory 17 and the reading of the corrected reproduced data and the outputting thereof are carried out in a predetermined sequence combined with the operation of the reproduced data processing circuit 18 when the memory 17 receives the memory address generated by the read address generating circuit 15 through the second switching circuit 16. In such case, when the respective addresses are generated, the address operation with respect to the memory 17 can be carried out at any time in response to the instruction from the controller 9.

The reproduced data of the memory 17 which is error corrected by the reproduced data processing circuit 18 is converted into the analog audio signal by a D/A converter 19. Thereafter, the analog audio signal is outputted to outside or is outputted to a host device which is connected with a terminal 22 through an interface 21.

The controller 9 receives an instruction for reproducing a desired sector from the host device through the terminal 22 and the interface 21. The controller 9 identifies the position on the magneto-optical disk 1 of the optical head 3 and controls an optical head moving mechanism (not shown) so as to move the optical head 3 to the desired position, i.e., the controller 9 has an access function. The controller 9 also identifies the sub-code information supplied from the reproduced data processing circuit 18. The controller 9 further gives the selecting instruction to the first switching circuit 10 and gives the address operating instruction to both the read address generating circuit 15 and the write address generating circuit 12.

Figure 4:
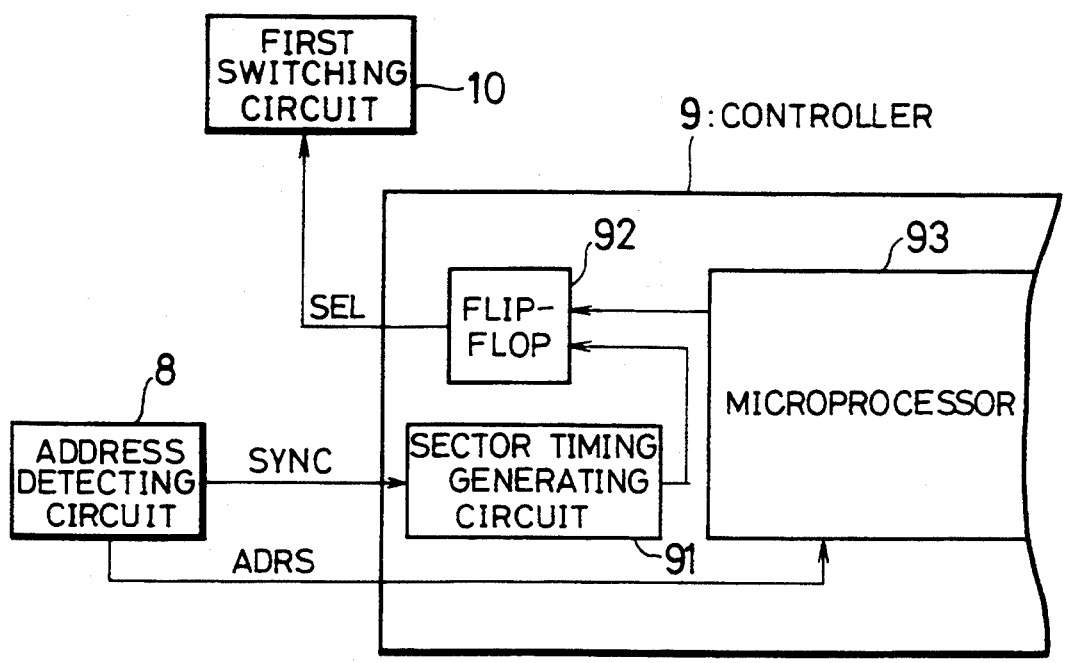
FIG. 4 is a block diagram showing a main portion of the internal structure of a controller.

FIG. 4 is a block diagram showing one example of the section which generates the selection instructing signal SEL which is outputted to the first switching circuit 10. The controller 9 has a sector timing generating circuit 91, a flip flop 92, and a microprocessor 93. The microprocessor 93 receives the address information ADRS from the address detecting circuit 8. The sector synchronizing signal SYNC is supplied to the sector timing generating circuit 91.

The sector synchronizing signal SYNC, which is located at the head end of each sector, is outputted from each sector. The sector timing generating circuit 91, to which the sector synchronizing signal SYNC is entered, outputs a sector timing pulse, by carrying out a predetermined time period of delay, to a clock terminal of the flip flop 92. In contrast, a switch instructing signal from the microprocessor 93 is entered to a data input of the clock terminal of the flip flop 92. With the arrangement, the selection instructing signal SEL for the first switching circuit 10 is formed such that the switch instructing signal from the microprocessor 93 is synchronized by the sector timing pulse.

Figure 2:
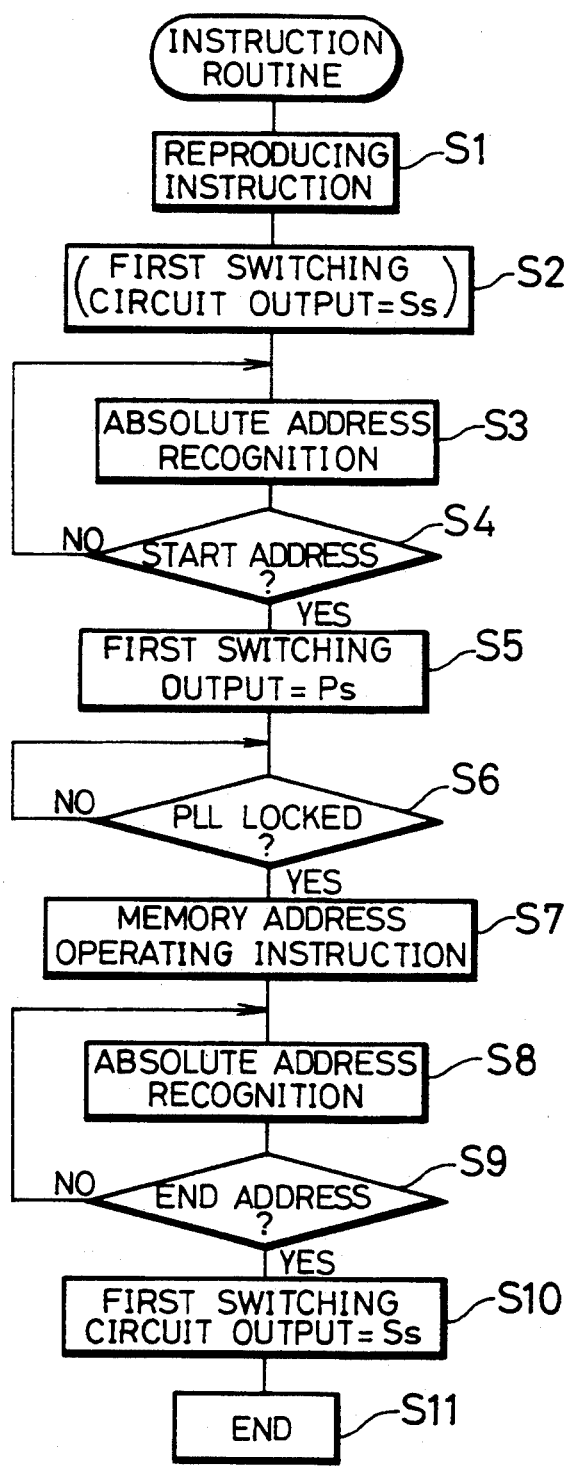
FIG. 2 is a flow chart showing an instructing routine of the information reproducing operation.
Figure 3:
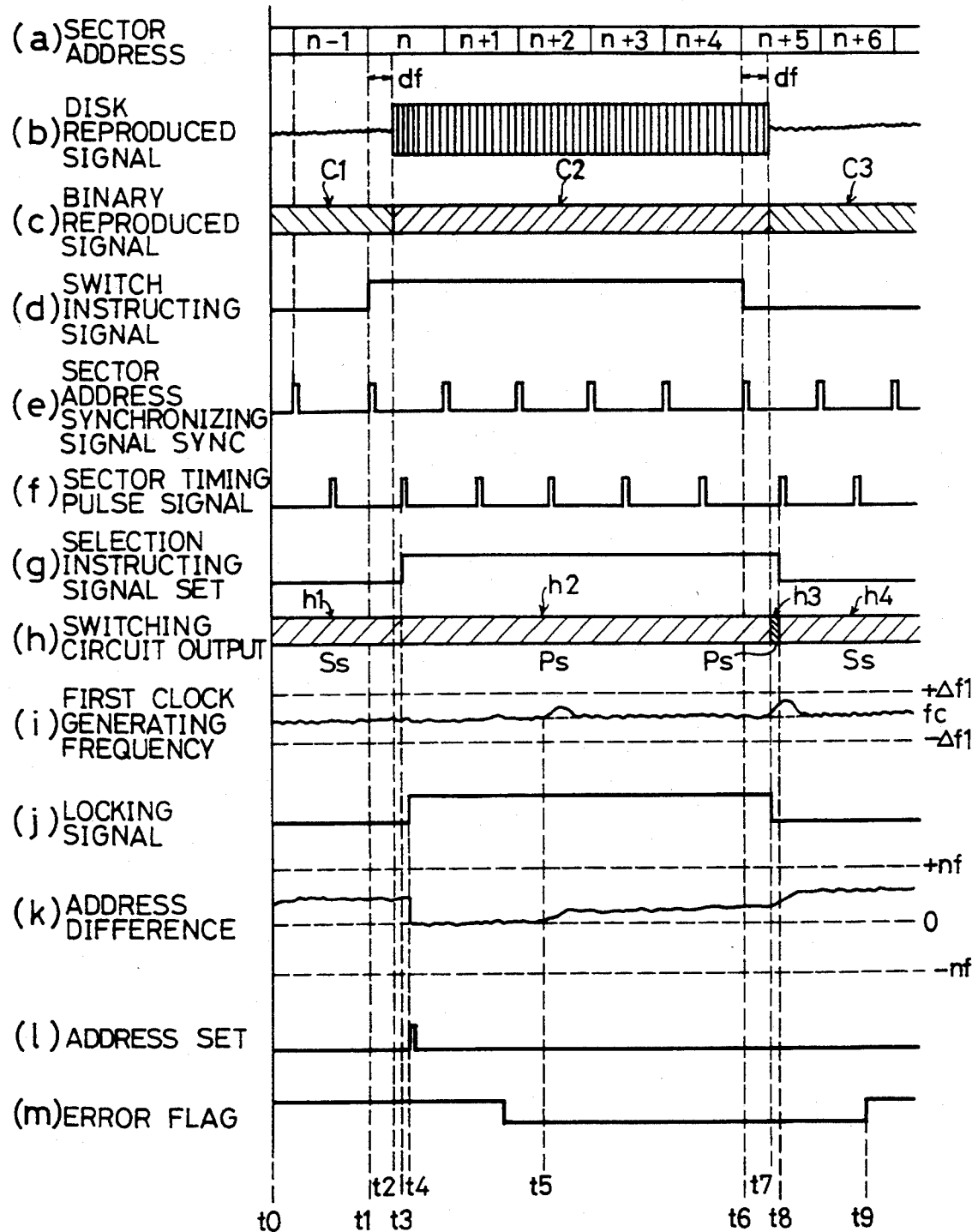
FIG. 3 is an explanatory diagram showing signals during the information reproducing.

The following description deals with an example where the information reproducing apparatus of FIG. 1 reproduces desired area, like the conventional case mentioned earlier, with reference to the flow chart of FIG. 2 and the time chart of FIG. 3.

FIG. 2 is a flow chart showing one example of the flow of instructing routine in the controller 9 of the information reproducing apparatus in accordance with the present embodiment, the instructing routine relating to both the memory address operating instruction and the switching instruction of the first switching circuit 10.

When the controller 9 receives an instruction for reproducing five sector areas of sector addresses (n) through (n+4) at S1, the controller 9 controls the first switching circuit 10 such that the first reference signal Ss selected (S2). Thereafter, the controller 9 identifies absolute address information from the address detecting circuit 8 (S3), and judges whether it is the reproducing start address ((n−1) is regarded as the start address since the reproducing should be started from the sector address (n) according to the present embodiment), and the processing not carried out, i.e., S3 or S4 continues to be carried out until the reproducing start address is identified (S4).

The controller 9 gives the switching instruction such that the binary magneto-optical signal Ps is outputted from the first switching circuit 10 upon identifying the sector address (n−1) at S5. Thereafter, the controller 9 judges whether the reproduced signal PLL of the first clock generating circuit 11 is in the locking state according to the PLL lock detecting signal from the reproduced data processing circuit 18 (S6). When the reproduced signal PLL is in the locking state, the operating instruction of the memory address is supplied to both the write address generating circuit 12 and the read address generating circuit 15 (S7). Instead of the PLL locking state judgement of S6 and S7, elapsing a predetermined time period may be adopted.

Thereafter, the absolute address is identified (S8), and it is judged whether the sector address is the reproducing end address, i.e., the sector address (n+4) at S9. The first reference signal Ss is outputted from the first switching circuit 10 upon identifying the reproducing end address (S10), thereby ending the reproducing operation (S11).

FIG. 3 is a time chart showing the reproducing operation corresponding to the above-mentioned instructing routine, i.e., shows the reproducing operation of the case where the recording information such as the computer-use coding data is stored over five sectors between the sector addresses (n) through (n+4) of the sector address (a) on the magneto-optical disk 1, the sector address (a) having the respective unique absolute address defined by the pre-recorded information.

A disk reproduced signal (b) delays by (df) with respect to the sector head end of each sector address (a). Respective sector addresses (n−1), (n+5), and (n+6) other than the five sectors are the information unrecorded areas. A binary reproduced signal (c) is formed by a comparator or other device in response to the disk reproduced signal (b). In the sector addresses (n−1), (n+5), and (n+6) of the information unrecorded areas, the disk reproduced signal (b) is equal to a noise level. The respective areas C1 and C3 of the corresponding binary reproduced signal (c) have meaningless data containing the high frequency component.

Since the time period between (t1) and (t6) corresponds to the areas to be reproduced, during the time period the switch instructing signal (d) is supplied from the controller 9 in accordance with the flow chart. The switching of the first switching circuit 10 is carried out in response to a selection instructing signal (g) which is synchronized by a sector timing pulse signal (f). The sector timing pulse signal (f) is generated by a sector address synchronizing signal (e) which is supplied from the address detecting circuit 8 to the controller 9.

In the case, the sector timing pulse (f) delays by ((t3)−(t1)) which is equal to the delay time of (df) inaddtion to the time corresponding to a predetermined error. Accordingly, the output of the first switching circuit 10 changes so as to be the first reference signal Ss during the time period of (h1) between (t0) and (t3) and so as to be the binary magneto-optical signal Ps during the time period of (h2), (h3) between (t3) and (t8) and so as to be the first reference signal Ss during the time period of (h4) from (t8).

As shown in FIG. 3(i), the corresponding reproduced signal PLL generating frequency of the first clock generating circuit 11 is the normal frequency fc synchronized with the first reference signal Ss during the time period between (t0) and (t3). Just after the time (t3), there occurs the instantaneous disturbance due to the switching operation of the first switching circuit 10. However, the reproduced signal PLL generating frequency is scarcely changed and follows the binary magneto-optical signal Ps in a short time. And, the reproduced signal PLL generating frequency follows the temporary rotation fluctuation of the magneto-optical disk 1 due to the mechanical shock at the time (t5). Thereafter, the frequency becomes temporarily high in response to the high frequency reproduced signal corresponding to the information unrecorded areas for a predetermined time period of (h3) from the time (t7) on. However, the reference follows again the normal frequency fc in response to the first reference signal Ss from the time (t8) on.

Note that a locking signal (j) indicates the blocking state of the reproduced signal PLL. Since the reproduced signal is not the normal EFM signal during the time period between (t0) and (t3) when the first reference signal Ss is selected, the locking signal (j) indicates the unlocked state. In contrast, the locking signal (j) indicates the locking state at the time (t4) that is a little bit later of the time (t3) when the normal EFM signal is entered. The locking signal (j) indicates again another unlocked state at the time (t7) when the entering of the normal EFM signal is finished.

When corresponding to the TBC operation, the first clock synchronized with the reproduced signal is used as a clock for the memory writing while the second clock having a constant frequency is used as a clock for the memory reading. Accordingly, the address difference (k) between the write address and the read address keeps a predetermined address difference during the time period between the times (t0) and (t4). At the time (t4), the address operation is carried out by the controller 9 like FIG. 3(l) such that the address difference becomes zero, thereby maximizing the jitter margin. The address difference of the maximum jitter margin can suppress the occurrence of the data overflow, since the disturbance of the time (t5) is kept within the deviation of the jitter margin. Thus, an error flag (m) of the reproducing example, indicative of the corrected results by the CIRC and is released followed by the interleave delay corresponding to one sector or more, can avoide that the error occurs due to the disturbance of the time (t5).

As is clear from the above-mentioned example, it is avoided that the first clock generating frequency becomes extraordinarily higher than the actual normal frequency fc. Accordingly, the pull-in operation of the reproduced signal PLL, which starts from the time (t4) when the sector data to be reproduced are entered, is carried out in a short time, thereby improving the reliability of the reading of the reproducing head end position.

The present embodiment deals with the case where the information reproducing apparatus uses the rewritable disk which is compatible with the CD. The present invention is not limited to the format used above. More specifically, the present invention can be adapted to another information reproducing apparatus which uses a recording medium having absolute address assigned even with respect to main information unrecorded area. The absolute address has no specific requirements provided that the information is pre-recorded and can be identified.

The present embodiment deals with the case where the magneto-optical disk-shaped recording medium is used. However, the present invention is not limited to such recording medium. More specifically, the present invention can be adapted to an information reproducing apparatus which uses other kind of rewritable recording medium and write-once type recording medium. The present invention is not limited to the disk-shaped recording medium. More specifically, the recording medium of the present invention may be a card-type recording medium and a tape-type recording medium provided that such recording medium falls within the scope of the present invention.

Figure 6:
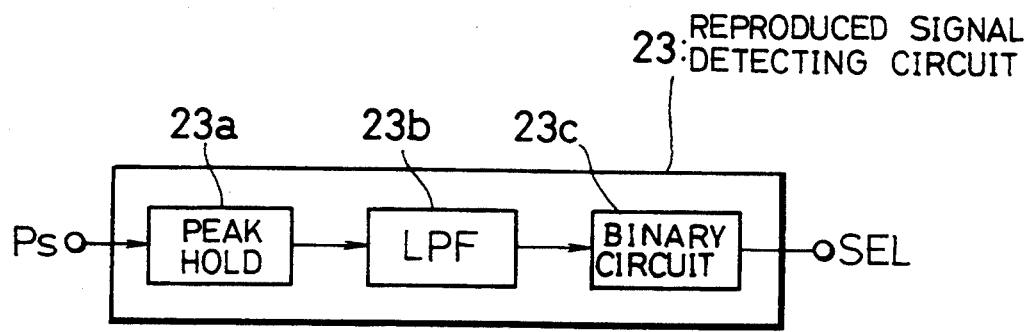
FIG. 6 is a block diagram showing a reproduced signal detecting circuit.
Figure 7:
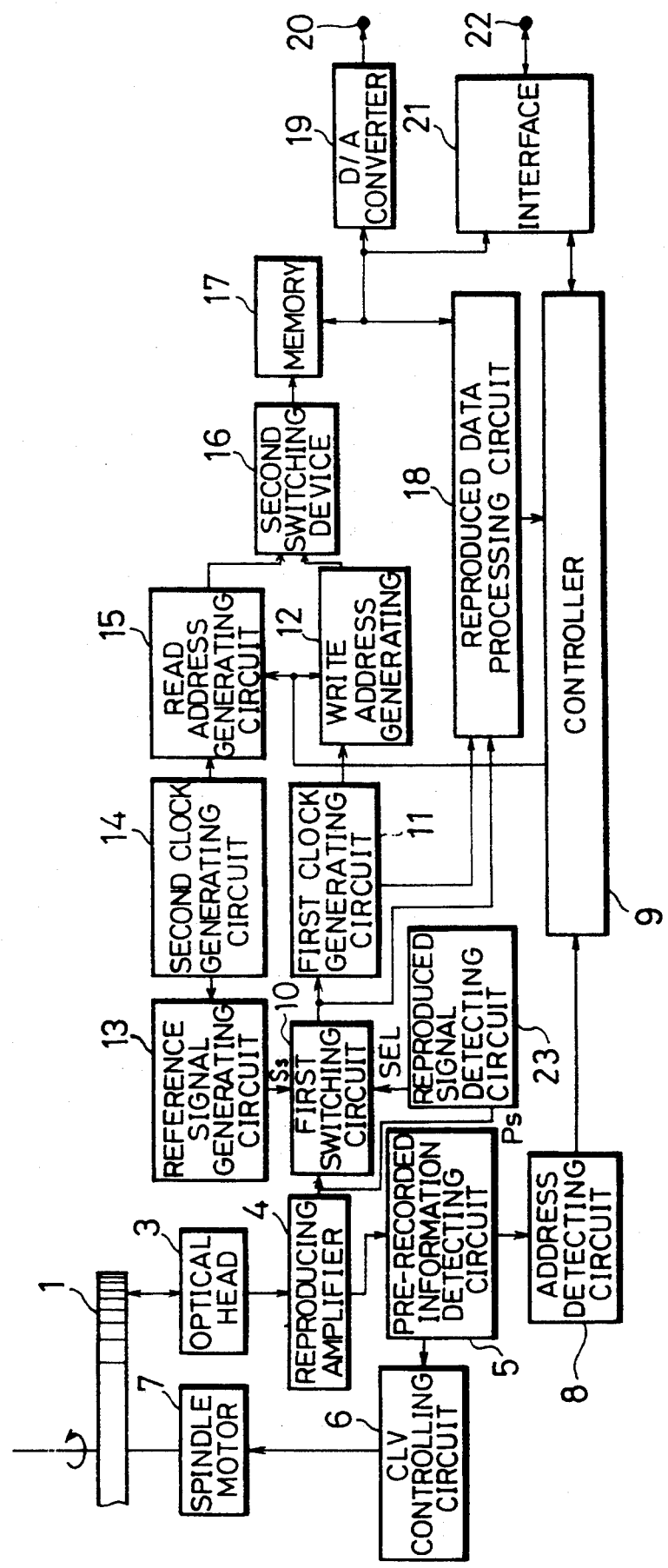
FIG. 7 is a block diagram showing an information reproducing apparatus of the second embodiment in accordance with the present invention.

The following description deals with the second embodiment of the present invention with reference to FIGS. 6 and 7. Note that FIG. 7 is a block diagram showing an information reproducing apparatus wherein the same reference numerals are assigned for the same members as those of FIG. 1 of the first embodiment.

The information reproducing apparatus of the present embodiment, as shown in FIG. 7, is distinguished over the first embodiment in that the selection instructing signal SEL, for selecting the output of the first switching circuit 10 is generated by a reproduced signal detecting circuit 23 (reproduced signal detecting means). More specifically, the reproduced signal detecting circuit 23, as shown in FIG. 6 for example, has (1) a peak hold circuit 23a for holding the peak level of an entered binary magneto-optical signal Ps for a predetermined time period, the time period corresponding to the longest bit of the EFM signal, and for outputting the peak hold signal; (2) a LPF (Low Pass Filter) 23b for removing the high frequency component of the output of the peak hold circuit 23a so as to form an envelope detection signal; (3) a binary circuit 23c for converting the envelope detection signal into a binary signal so as to form the selection instructing signal SEL of the first switching circuit 10 and other circuits. When the binary magneto-optical signal Ps is entered to the LPF 23b, the high frequency components contained in the reproduced signal (corresponding to the reproduced signal of the main information unrecorded area) are removed, thereby extracting only the reproduced signal of the main information recorded area. More specifically, it is identified in accordance with the reproduced signal whether the main information recorded area is reproduced or the main information unrecorded area is reproduced.

Thus, according to the information reproducing apparatus of the present embodiment, the reproduced signal detecting circuit 23 outputs the selection instructing signal SEL in nearly equal timing of FIG. 3(g) in correspondence to the disk reproduced signal (b). This results in the same effect as that of the first embodiment. The foregoing explanation is made based on the time chart of FIG. 3 of the first embodiment.

Note that a controller 24 of the present embodiment corresponds to the structure which excludes the hardwear and flow chart relating to the generation of the selection instructing signal SEL from the structure of FIGS. 1 and 2 of the first embodiment.

Figure 8:
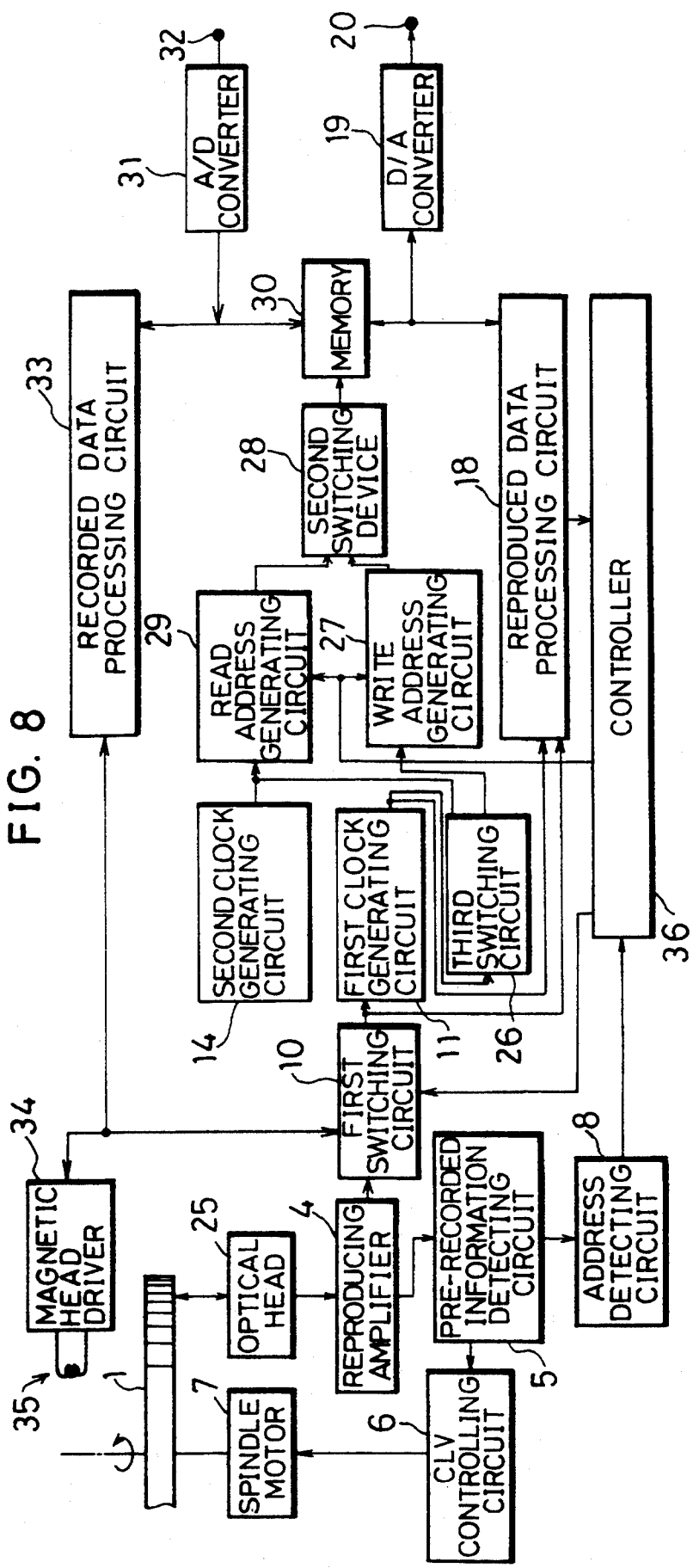
FIG. 8 is a block diagram showing an information reproducing apparatus of the third embodiment in accordance with the present invention.
Figure 9:
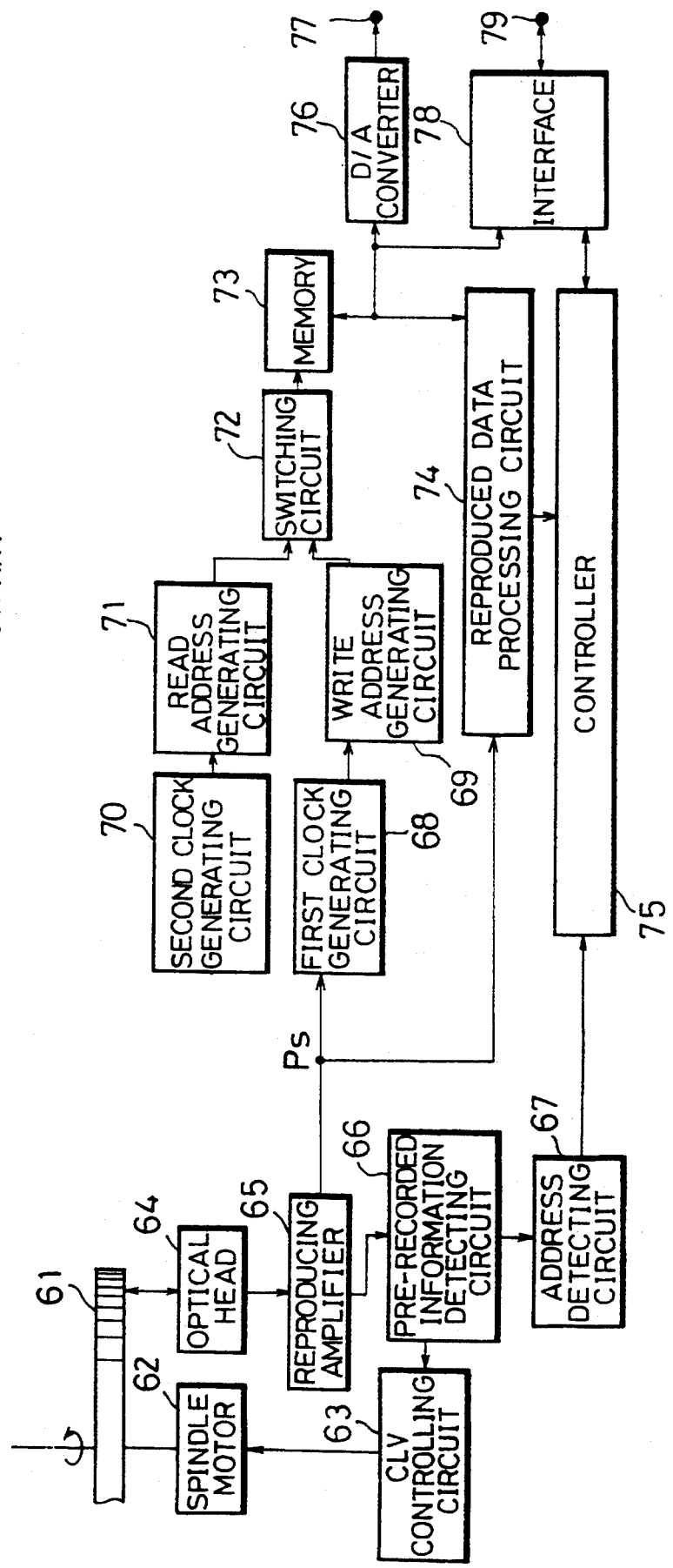
FIG. 9 is a block diagram showing a conventional information reproducing apparatus.
Figure 12:
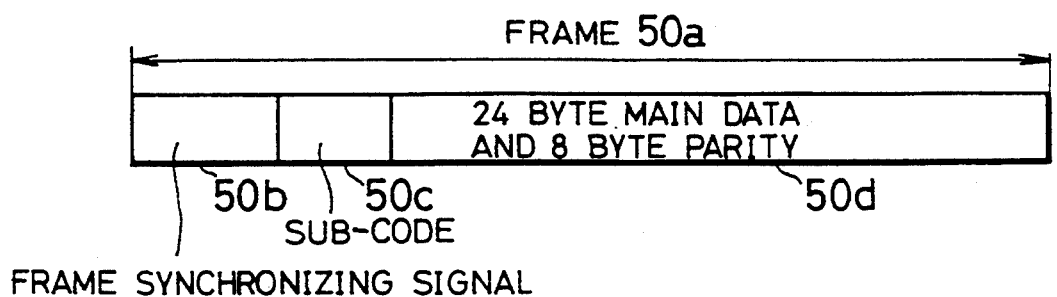
FIG. 12 is a depiction illustrating a format of a frame signal of the disk.
Figure 13:
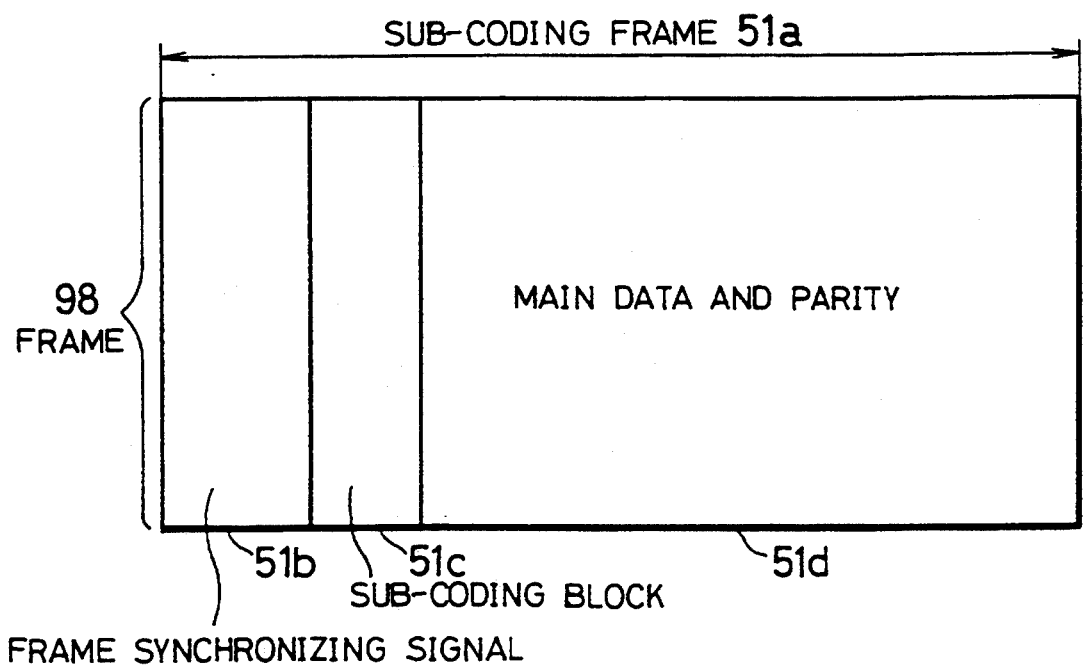
FIG. 13 is a depiction illustrating a sector format of the compact disk.
Figure 14:
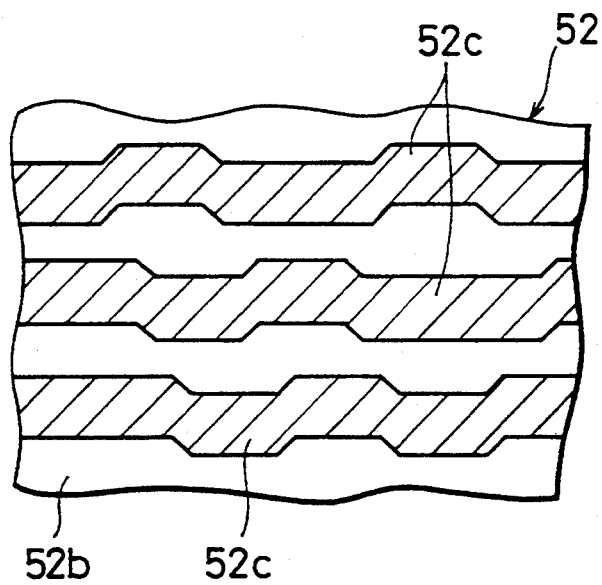
FIG. 14 is an enlarged plan view showing the main portion of a magneto-optical disk.

The following description deals with the third embodiment of the present invention with reference to FIG. 8. Note that FIG. 8 is a block diagram showing an information reproducing apparatus wherein the same reference numerals are assigned for the same members as those of FIG. 1 of the first embodiment.

The information reproducing apparatus of the present embodiment, as shown in FIG. 8, has a recording function. More specifically, when analog audio information is externally entered through a terminal 32 during the recording operation, an A/D converter 31 convers it into digital form so as to be written to a memory 31. The CIRC coding and the adding of the sub-code information are carried out by a recording data processing circuit 33 (recording information processing means) with respect to the digital audio data read from the memory 30 and thereafter it is outputted to a magnetic head driver 34 as the recording signal to which the EFM frame synchronized signal is added. The magnetic head driver 34 drives a coil 35 in response to the entered EFM recording signal such that the megnetic field is applied to the position which is opposite to an optical head 25. The megnetic field applying combined with the beam projecting having the recording-use light intensity from the optical head 25 has information recorded.

As to the address generation of the memory 30 corresponding to the above-mentioned recording operation, the write address is generated by a write address generating circuit 27 through a third switching circuit 26 by use of a reference clock of the second clock generating circuit 14. The read address is generated by a read address generating circuit 29 by use of the reference clock the second clock generating circuit 14. The respective addresses are switched by a second switching circuit 28 so as to supply to the memory 30.

In contrast, as to the reproducing operation, the present embodiment distinguishes over the first embodiment in that one of entering means of the first switching circuit 10 is different from each other, i.e., the recording data processing circuit 33 is provided for processing externally entered recording information so as to be converted into a recording signal having a signal format suitable for the recording medium character, the converted signal being outputted. More specifically, the recording data processing circuit 33 outputs the recording singal even during the reproducing, the recording signal of the recording data processing circuit 33 is used as the first reference signal according to the present embodiment.

Therefore, it is not necessary to separately provide an exclusive circuit for the first reference signal which substitutes for the reproduced signal of the information unrecorded area on the magneto-optical disk 1 according to the information reproducing apparatus of the present embodiment, thereby decreasing the burdens of the circuit.

The information reproducing apparatus of the present invention, as mentioned above, has an arrangement such that main information recorded area and main information unrecorded area are identified in accordance with the address information which is pre-recorded on the recording medium and such that the first reference signal is selected during the reproducing of the main information unrecorded area while the reproduced signal is selected during the reproducing of the main information recorded area. Therefore, when the main information unrecorded area is reproduced, the clock for carrying out the reproducing of main information is synchronized with the first reference signal, which corresponds to the reproduced signal, during the reproducing of the main information unrecorded area. So, when the reproducing area is changed from the main information unrecorded area to the main information recorded area, the synchronizing with the reproduced signal is carried out in a short time, thereby improving the reliability of the reproducing process.

Alternatively, the identifying between the main information recorded area and the main information unrecorded area may be done in response to the reproduced signal from the recording medium. In such case, the synchronizing with the reproduced signal is also carried out in a short time when the reproducing area is changed from the main information unrecorded area to the main information recorded area since the clock for carrying out the reproducing of main information is synchronized with the first reference signal, which corresponds to the reproduced signal, during the reproducing of the main information unrecorded area, thereby improving the reliability of the reproducing process.

Moreover, instead of the reference signal generating means, recording signal processing means may be adopted, the recording signal processing means processing externally entered recording information so as to be converted into a recording signal having a signal format suitable for the recording medium character, the converted signal being outputted. In such case, the recording signal corresponds the first reference signal. With the arrangement, it is not necessary to separately provide an exclusive means for generating the first reference signal, thereby decreasing the burdens of the circuit.

There are described above novel features which the skilled man will appreciate give rise to advantages. These are each independent aspects of the invention to be covered by the present application, irrespective of whether or not they are included wihtin the scope of the following claims.

What is claimed is:

1. An information reproducing apparatus for reproducing main information from a desired area of a recording medium based on an identification between a main information recorded area and a main information unrecorded area in accordance with address information which is pre-recorded on the recording medium, comprising:

reference signal generating means for generating a first reference signal corresponding to a reproduced signal of the main information, said reference signal generating means including oscillating means for outputting a clock signal having a frequency which is a predetermined multiple of an audio sampling frequency, said first reference signal being synthesized so as to alternate between a first signal having a 23 dividing frequency of said clock signal and a second signal having a 24 dividing frequency of said clock signal;

selecting means for selecting one of the reproduced signal and the first reference signal which are entered to said selecting means;

controlling means, which generates a selection instructing signal in response to the address information, for controlling said selecting means in accordance with said selection instructing signal such that the reproduced signal is selected during reproducing of the main information recorded area while the first reference signal is selected during reproducing of the main information unrecorded area; and reproduced signal processing means, which is connected with said selecting means and generates a clock synchronized with the output of said selecting means, for carrying out a reproducing process of the main information in response to said clock.

2. The information reproducing apparatus as set forth in claim 1, wherein said address information has synchronizing signals associated therewith and said controlling means includes:

timing generating means for generating a timing signal for each synchronized signal of the address information; and synchronizing means for identifying between start and end positions of the main information recorded area according to said timing signal, and for synchronizing said selection instructing signal with said timing signal.

3. The information reproducing apparatus as set forth in claim 1, wherein said controlling means includes:

a sector timing generating circuit for generating a sector timing pulse, said sector timing pulse being generated by delaying the signal which is entered to said selecting means by a predetermined time period; and a flip-flop circuit having a clock input terminal, a data input terminal and an output terminal, wherein said sector timing pulse is inputted to the clock input terminal, a signal for the selecting operation is inputted to the data input terminal, and said selection instructing signal is outputted from the output terminal.

4. The information reproducing apparatus as set forth in claim 1, further comprising:

first clock generating means, connected with said selecting means, for generating a write address generating-use clock in response to said selecting means;

write address generating means for generating a write address in response to the write address generating-use clock;

second clock generating means for outputting a clock for generating said first reference signal by said reference signal generating means, and for generating a read address generating-use clock;

read address generating means for generating a read address in response to the read address generating-use clock; and memory means wherein reproduced data are written with respect to the generated write address while the reproduced data are read from the generated read address.

5. The information reproducing apparatus as set forth in claim 1, wherein the recording medium is rewritable disk which is compatible with a compact disk.

6. An information reproducing apparatus for reproducing main information from a desired area of a recording medium, comprising:

reference signal generating means for generating a first reference signal corresponding to a reproduced signal of the main information, said reference signal generating means including oscillating means for outputting a clock signal having a frequency of a predetermined multiple of an audio sampling frequency, wherein said first reference signal is synthesized so as to alternate between a first signal having a 23 dividing frequency of said clock signal and a second signal having a 24 dividing frequency of said clock signal;

selecting means for selecting one of the reproduced signal and the first reference signal which are entered to said selecting means;

reproduced signal detecting means for detecting a state of the reproduced signal from the recording medium, and for outputting the detected state as a selection instructing signal;

controlling means for controlling said selecting means in accordance with said selection instructing signal such that the reproduced signal is selected during reproducing of a main information recorded area while the first reference signal is selected during reproducing of a main information unrecorded area;

and reproduced signal processing means, which is connected with said selecting means and generates a clock synchronized with the output of said selecting means, for carrying out a reproducing process of the main information in response to said clock.

7. The information reproducing apparatus as set forth in claim 6, wherein the recording medium is rewritable disk which is compatible with a compact disk.

8. An information reproducing apparatus for reproducing main information from a desired area of a recording medium, comprising:

reference signal generating means for generating a first reference signal corresponding to a reproduced signal of the main information;

selecting means for selecting one of the reproduced signal and the first reference signal which are entered to said selecting means;

reproduced signal detecting means for detecting a state of the reproduced signal from the recording medium, and for outputting the detected state as a selection instructing signal;

controlling means for controlling said selecting means in accordance with said selection instructing signal such that the reproduced signal is selected during reproducing of a main information recorded area while the first reference signal is selected during reproducing of a main information unrecorded area;

and reproduced signal processing means, which is connected with said selecting means and generates a clock synchronized with the output of said selecting means, for carrying out a reproducing process of the main information in response to said clock;

said apparatus further including first clock generating means, connected with said selecting means, for generating a write address generating-use clock in response to said selecting means;

write address generating means for generating a write address in response to the write address generating-use clock;

second clock generating means for outputting a clock for generating said first reference signal by said reference signal generating means, and for generating a read address generating-use clock;

read address generating means for generating a read address in response to the read address generating-use clock; and memory means wherein reproduced data are written with respect to the generated write address while the reproduced data are read from the generated read address.

9. An information reproducing apparatus for reproducing with respect to a recording medium having pre-recorded address information, comprising:

an optical head;

means for converting main information, which is reproduced from the recording medium through said optical head, into a binary signal;

reference signal generating means for generating a first reference signal corresponding to the reproduced signal of the main information, said reference signal generating means including oscillating means for outputting a clock signal having a frequency which is a predetermined multiple of an audio sampling frequency, said first reference signal being synthesized so as to alternate between a first signal having a 23 dividing frequency of said clock signal and a second signal having a 24 dividing frequency of said clock signal;

means for detecting the address information;

means for identifying in accordance with the detected address information between a main information recorded area and a main information unrecorded area, and for outputting the identified result as a selection instructing signal;

selecting means for selecting the reproduced signal during reproducing of the main information recorded area while selecting the first reference signal during reproducing of the main information unrecorded area in accordance with said selection instructing signal; and reproduced signal processing means, which is connected with said selecting means and generates a clock synchronized with the output of said selecting means, for carrying out a reproducing process of the main information in response to said clock.

10. The information reproducing apparatus as set forth in claim 9, further comprising:
first clock generating means, connected with said selecting means, for generating a write address generating-use clock in response to said selecting means;
write address generating means for generating a write address in response to the write address generating-use clock;
second clock generating means, which outputs a clock for generating the first reference signal by the reference signal generating means, and for generating a read address generating-use clock;
read address generating means for generating a read address in response to the read address generating-use clock;
switching means for switching between the read address and the write address; and
memory means wherein reproduced data are written to and read from the specified address of said switching means.

11. The information reproducing apparatus as set forth in claim 9, wherein said selection instructing signal outputting means includes:
a sector timing generating circuit for generating a sector timing pulse, said sector timing pulse being generated by delaying the signal which is entered to said selecting means by a predetermined time period; and
a flip flop circuit having a clock input terminal, a data input terminal and an output terminal,
wherein said sector timing pulse is inputted to the clock input terminal, a signal for the selection operation is inputted to the data input terminal, and said selection instructing signal is outputted from the output terminal.

12. A method for reproducing main information from a desired area of a recording medium, comprising the steps of:
(a) generating a first reference signal corresponding to a reproduced signal of the main information by
(1) providing a clock signal having a frequency which is a predetermined multiple of an audio sampling frequency; and
(2) causing said first reference signal to alternate between a first signal having a 23 dividing frequency of said clock signal and a second signal having a 24 dividing frequency of said clock signal;
(b) identifying between reproducing of a main information recorded area and reproducing of a main information unrecorded area;
(c) selecting the reproduced signal during the reproduction of the main information recorded area and selecting the first reference signal during the reproducing of the main information unrecorded area; and
(d) generating a clock synchronized with the selected signal in the step (c) and carrying out a reproducing process of the main information in response to the clock.

13. The information reproducing method as set forth in claim 12, said identifying in the step (b) is carried out based on address information which is pre-recorded on the recording medium.

14. An information reproducing apparatus for reproducing main information from a desired area of a recording medium based on an identification between a main information recorded area and a main information unrecorded area in accordance with address information having synchronizing signals associated therewith which is prerecorded on the recording medium, comprising:
reference signal generating means for generating a first reference signal corresponding to reproduced signal of the main information, said reference signal generating means including oscillating means for outputting a clock signal having a frequency which is a predetermined multiple of an audio sampling frequency, said first reference signal being synthesized so as to alternate between a first signal having a 23 dividing frequency of said clock signal and a second signal having a 24 dividing frequency of said clock signal;
selecting means for selecting one of the reproduced signal and the first reference signal which are entered to said selecting means;
controlling means, which generates a selection instructing signal in response to the address information, for controlling said selecting means in accordance with said selection instructing signal such that the reproduced signal is selected during reproducing of the main information recorded area while the first reference signal is selected during reproduction of the main information unrecorded area;
said controlling means including:
timing generating means for generating a timing signal for each synchronized signal of the address information;
synchronizing means for identifying between start and end positions of the main information recorded area according to said timing signal, and for synchronizing said selection instructing signal with said timing signal;
a sector timing generation circuit for generating a sector timing pulse, said sector timing pulse being generated by delaying the signal which is entered to said selecting means by a predetermined time period; and a flip flop circuit having a clock input terminal, a data input terminal and an output terminal,
wherein said sector timing pulse is inputted to the clock input terminal, a signal for the selecting operation is inputted to the data input terminal, and said selection instructing signal is outputted from the output terminal; and
reproduced signal processing means, which is connected with said selecting means and generates a clock synchronized with the output of said selecting means, for carrying out a reproducing process of the main information in response to said clock.

* * * * *